United States Patent [19]
Waters

[11] 3,909,131
[45] Sept. 30, 1975

[54] SURFACE GAUGING BY REMOTE IMAGE TRACKING

[75] Inventor: James P. Waters, Rockville, Conn.

[73] Assignee: United Technologies Corporation, Hartford, Conn.

[22] Filed: Feb. 12, 1974

[21] Appl. No.: 442,269

[52] U.S. Cl. .................. 356/3; 250/578; 356/4; 356/167
[51] Int. Cl.² .................................. G01B 11/24
[58] Field of Search .......... 356/3, 167, 4; 250/578

[56] References Cited
UNITED STATES PATENTS
3,671,126  6/1972  Erb .................................. 356/167
FOREIGN PATENTS OR APPLICATIONS
684,435  12/1952  United Kingdom ............... 356/170

Primary Examiner—Ronald L. Wibert
Assistant Examiner—Richard A. Rosenberger
Attorney, Agent, or Firm—Anthony J. Criso

[57] ABSTRACT

Methods and apparatus for gauging the surface of a diffusely reflective object by remote optical imaging are disclosed. The invention represents a practical solution to the problem of quickly providing surface measurements with an accuracy in the range of hundreds of a microinch. Two modes of operation, one in which the detector is translated, and the other in which the object is translated are discussed. Also, an analytical relationship which correlates the motion of the probe spot on the object and the motion of the reflected spot on the detector is provided. Variations to certain components of the apparatus and the limits of the more prominent error factors relevant to the invention are developed.

6 Claims, 5 Drawing Figures

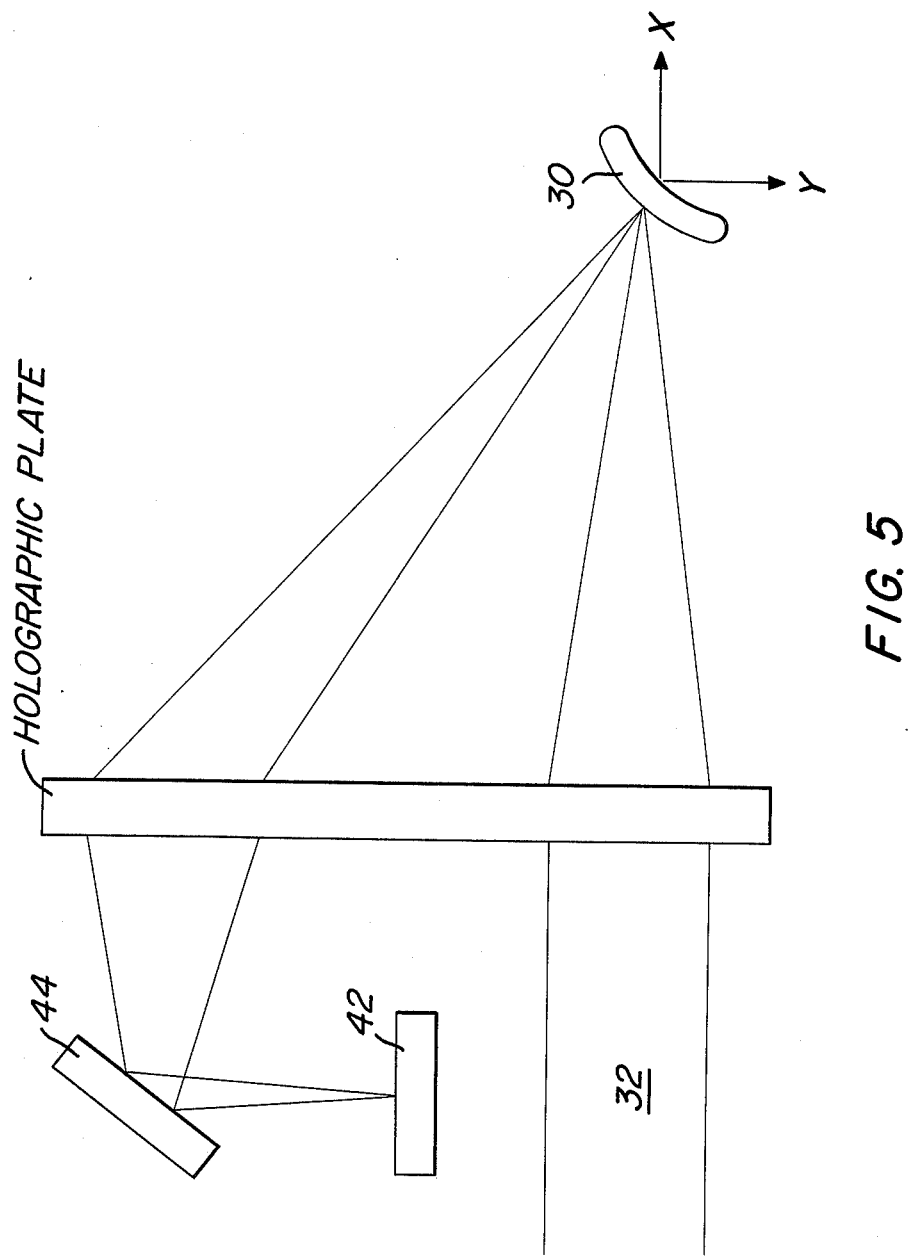

SURFACE GAUGING BY REMOTE IMAGE TRACKING

BACKGROUND OF THE INVENTION

1. Field of Invention

The present invention relates to surface gauging and more particularly to a device for remotely recording the spatial location of a focused spot of light.

2. Description of the Prior Art

The advantages of determining the surface contour of an object by techniques which avoid the necessity of having a probe contact the surface under investigation have been recognized in the past. Some of the more practical of the noncontact gauging devices are based on various optical systems such as those using the coherent interference of two monochromatic light beams to accurately determine the contour of a surface. In an interferometric device of this type, a reference beam is scanned along a path of known length while an object beam is scanned along a path on the surface of the test object; the reflective energy from the object beam is beat against the reference beam to produce an interference pattern. The resulting fringe pattern correlates directly with the contour of the surface. Surface variations as small as ten microinches are discernible with this technique although the apparatus involved is extremely sensitive to vibrations. Thus while the system is feasible and extremely accurate it tends to be relatively expensive and somewhat impractical. In many instances the surface of the object to be gauged is relatively coarse and produces a diffuse scattering of the object beam. Under these operating conditions the signal to noise ratio produced is so low as to pose a major obstacle to the implementation of surface gauging by interferometry.

One of the known methods of avoiding the low signal to noise problem described above involves the use of holographic contouring of a surface. In the hologram approach two successive holograms are made of the surface in question on a single holographic plate. The phase of the object beam is altered between the formation of the first and second holograms so that interferometric fringes are produced on the reconstructed image. These fringes are an indication of changes in surface depth on the test object. While holographic contouring avoids one of the principal shortcomings of interferometry, it is less accurate by an order of magnitude. Also, holographically reconstructive images can resolve approximately 2,500 lines per inch and therefore to maintain an accuracy of approximately 100 microinches requires that the variations in surface contour not exceed more than about 75 mils per inch. The limitation is exceeded in applications such as the gauging of turbine blades and vanes. Additional considerations are the requirements for vibration isolation as well as the film processing time required for realistic hologram formation.

In addition to the art described, the patents entitled Noncontacting Optical Probe to Erb, U.S. Pat. No. 3,671,126 and Zoot et al., U.S. Pat. No. 3,679,307, respectively, describe optical methods of surface gauging; they represent noncontacting optical concepts based on geometrical relationships between a source of radiation and a detector. Each of these inventions is capable of two modes of operation; in a first mode, the apparatus is arranged so that the surface being gauged has variations which are insufficient to cause the imaged spot to move completely off an interface on a photoelectric bicell. Such devices are preferred over a mechanical probe in certain applications, however, their usefulness is limited by the temperature sensitivity of the detector material which changes the linearity of the detector and introduces inaccuracies in the gauging data produced with such systems. Further, this first mode has the disadvantages of a limited dynamic range and relatively low accuracy. In a second mode, the apparatus can measure relatively large surface variations in a configuration in which the imaged spot is allowed to move off the interface on the detector. In the second mode, provision is made for relative motion in the system to cause the imaged spot to return to the bicell interface; when operated in this mode, the spot is driven from its most remote location back to the interface and stopped. The alternate mode has an improved dynamic range, however, the accuracy of measurement and the speed at which it can be produced are both rather limited. What is needed is a noncontact, surface gauging system which is quick and accurate over a wide dynamic range.

SUMMARY OF THE INVENTION

A primary object of the present invention is to quickly and accurately gauge the surface of a test specimen with remote apparatus which does not contact the specimen.

My invention recognizes that a diffusely reflecting surface, a radiation source and a radiation detector can be trigonometrically related to allow rapid measurement of contour variations on the surface with microinch accuracy. The invention is predicated on the recognition that as a focused spot of radiation is moved in discrete increments across the surface, contour variations can be measured by electronically following the position of an image of the spot on a detector array, and recording the amount of relative detector motion required to cause the imaged spot to go through a null position without having to bring the imaged spot to rest at null.

According to the present invention, a source of intensity modulated electromagnetic radiation is directed onto the surface of a diffusely scattering specimen along a first axis of propagation by radiation concentrating means, and a collecting means projects an imaged spot of some of the scattered radiation onto a detector along a second axis of propagation to provide electronic signals which are descriptive of the position of the imaged spot; as the source radiation advances across the surface of the specimen, the detector is moved with respect to the specimen in response to the electronic signals to cause the imaged spot to drive toward a null position on the detector, and calibrated recording means register the variations in the surface of the specimen as represented by the travel of the imaged spot on the detector. Further, the displacement of the imaged spot on the surface of the detector is proportional to the variation in the surface contour of the test specimen, the actual calibration of the recording means being a trigonometric function of the angle formed by the intersection of the first and second axes of propagation.

The primary advantages of the present invention include its accuracy, swift response time and ease of implementation. The surface gauging is accomplished with a completely noncontact system which avoids the problems usually associated with gauge tip wear and replacement. Also, the apparatus involved is not subject to cosine rolloff so that the incident radiation does not necessarily have to be maintained perpendicular to the surface being gauged. Suitable electronics in combination with a modulated light source eliminate the background noise and associated problems.

A primary feature of the present invention is the alternate modes of operation; in a first mode, the detector is moved with respect to the specimen until a null position is found and in the second mode, the specimen is translated with respect to the detector to locate the null position. During a gauging, the specimen is continually repositioned by a successive series of rapid incremental movements. A lightweight translatable table is driven by a linear actuator which permits a frequency response of 20 to 30 cycles per second and surface variations on the test specimen can be measured to within one tenth thousandth of an inch. Another feature of this invention is the ability to use either a collimated or an uncollimated radiation sourse depending upon the particular embodiment selected. The means for concentrating the source radiation and the radiation reflected from the object can be either conventional lenses or holographic lenses.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 5 is a simplified schematic diagram of the invention with holographic lenses.

DESCRIPTION OF THE PREFERRED EMBODIMENT

Figure 1:
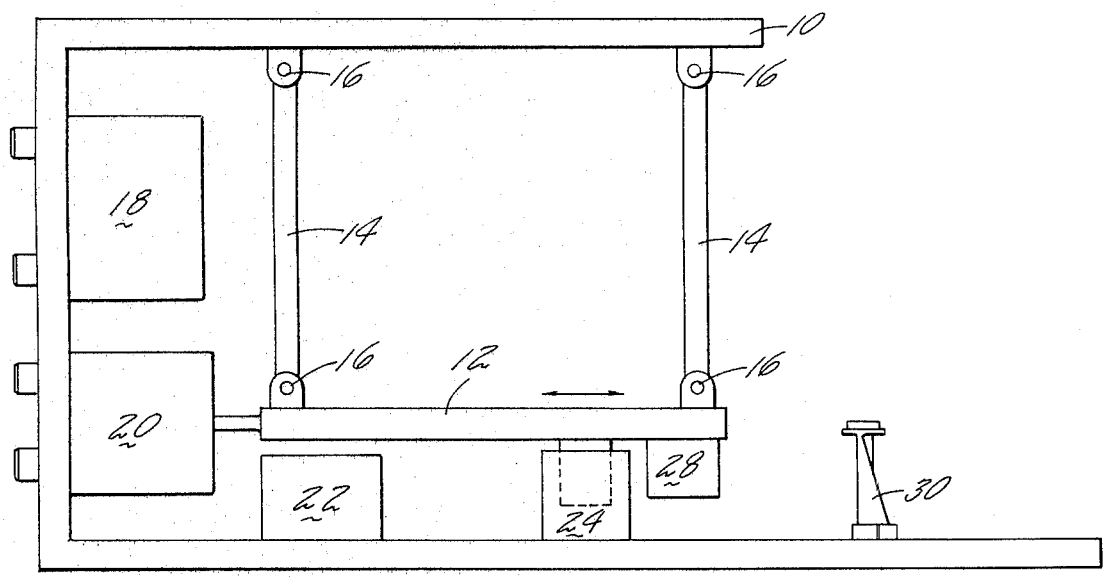
FIG. 1 is a simplified schematic elevation view of an automatic image tracking device for gauging surfaces by remote means in accordance with the present invention.

The overall structure and relative placement of the various components which comprise the present invention are shown in FIG. 1. A reference table 10 forms a main structural element in the system and translatable table 12 is attached to the reference table with support arms 14 which join the reference and translatable table at rotatable attachments 16. A power amplifier and other electronics 18, a linear actuator 20, a light source 22 and a linear encoder 24 are rigidly attached to the reference table, the actuator being slidably attached to the translatable table as will be described in greater detail. An optical head 28 is fixedly attached to the translatable table. A test specimen 30 is shown on the reference table.

Figure 2:
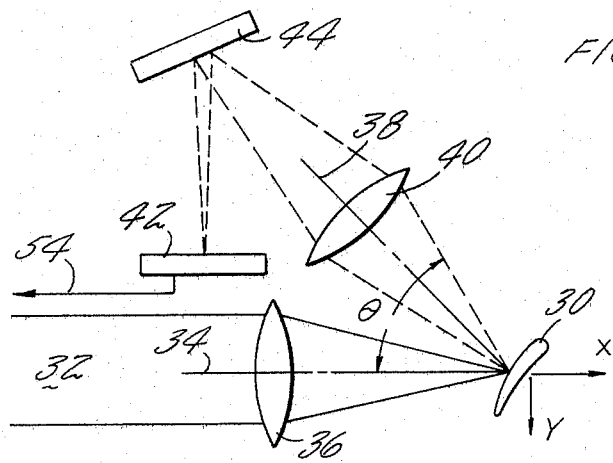
FIG. 2 is a simplified schematic diagram showing the principal optical components of the device.

The primary optical elements contained in the optical head 28 are shown schematically in FIG. 2. A collimated beam 32 of incident energy from the light source is focused to a spot on the test specimen along an incident axis 34 with an incident lens 36. The spot is imaged along a collecting axis 38 with collecting lens 40 onto a detector 42 with a folding mirror 44. The light source 22 providing the collimated beam 32 can be any source of the collimated electromagnetic radiation although it is usually in the visible or near infrared range. Radiation from light emitting diodes or visible radiation such as the output from a helium neon laser are especially suited to this invention.

An insight into the correlations necessary for surface gauging with the methods and apparatus described herein can be provided in terms of the geometric placements of some of the elements with reference to FIG. 2. The centerlines of the incident lens and the collecting lens intersect on the surface on the test specimen at the spot where the collimated beam is focused and an angle $\theta$ is formed between the centerlines. If the specimen is translated in the Y direction, the spot will move to a new X location on the surface of the specimen and the imaged spot will move across the surface of the detector a distance $\epsilon$ which is proportional to the change in the X coordinate. The amount of movement by the imaged spot across the surface of the detector can be described by the relationship $$\Delta\epsilon = - \frac{\eta_o f_2 \Delta X \sin\Theta}{(\eta_o - f_2)(\eta_o + \Delta X \sin\Theta)} \qquad \text{Eq. (1)}$$

where
  $\Delta\epsilon$ is the translation distance across the surface of the detector,
  $\eta_0$ is the distance from the surface of the specimen to the principal plane of the collecting lens,
  $f_2$ is the focal length of the collecting lens,
  $\Delta X$ is the distance moved along the central axis of the incident beam by the focused spot.

In many practical applications $\Delta X/\eta_0 \ll 1$ and the equation above can be reduced to $$\Delta\epsilon = - \left(\frac{f_2}{\eta_o - f_2}\right) \Delta X \sin\Theta \qquad \text{Eq. (2)}$$

Within the limits of its applicability, the displacement of the spot imaged on the surface of the detector as described in Equation (2) is proportional to the surface displacement of the focused spot along the X axis of the test specimen. The product of the optical magnification and the sine of the angle between the lens centerlines represents the proportionality constant relating the motion on the surface of the specimen to the motion on the surface of the detector.

Figure 3:
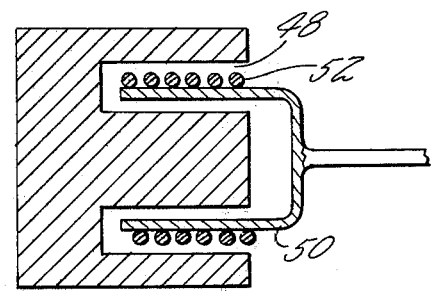
FIG. 3 is a simplified sectional view through the linear actuator used to drive the translatable table.

FIG. 3 is a simplified sectional view through the linear actuator used to drive the translatable table as shown in FIG. 1. A permanent magnet core 46 has annular slot 48 to receive a hollow cylinder extension 50 of the translatable table 12. An electrical winding 52 is mechanically attached to the bar extension and electrically connected to a source of electric power not shown in the drawing. The linear actuator is constructed so that the translatable table will move reciprocally in the horizontal direction as shown in FIG. 1 in response to electric currents passed through the winding inside the actuator.

The detector required in the present invention has a radiation sensitive surface and in combination with associated electronic circuitry responds to input signals which have a preselected intensity modulation frequency, the modulation being provided by suitable tailoring of the input radiation from the helium-neon laser. The detector has discrete radiation responsive surface zones and null regions, a null region being a relatively narrow interface formed between adjacent zones. As the imaged spot of modulated light moves across the surface of the detector the relative resistance of each discrete zone is subject to change. By electrically connecting each zone to suitable electrical circuitry, the precise surface zone on which the imaged spot is located is readily determinable.

Figure 4:
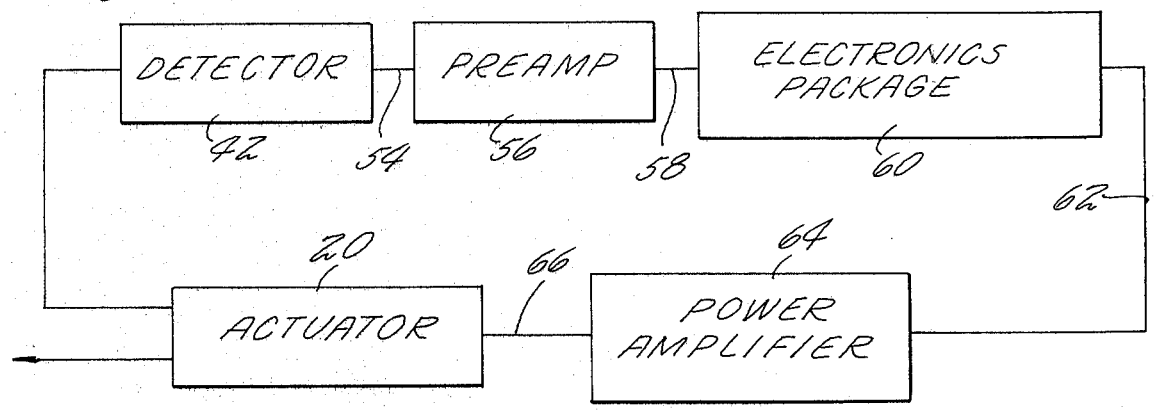
FIG. 4 is a simplified block diagram showing the interaction of the primary components in the servosystem of the present invention.

A preferred servosystem is shown in simple block diagram form in FIG. 4. An output signal 54 is produced by the surface of the detector and is passed through a preamplifier 56 to enhance the strength of the focusing. An enhanced signal 58 is subsequently passed to an electronic package 60 which provides an fixed signal 62. The error signal is passed through a power amplifier 64 to provide a drive signal 66 to the linear actuator 20 to move the translatable table in the X direction and cause the imaged spot to move toward a null position on the detector.

In the operation of the invention, the test specimen is moved across the incident axis in a digital manner whereby twenty to thirty incremental moves of the specimen are made each second. The electrical output signal 54 is produced as a result of the presence of an imaged spot of radiation on the detector surface and the error signal 62 derived therefrom in the electronic package causes the linear actuator to move the translatable table in a direction that slews the imaged spot across the detector toward a null position. The spot does not stop at the null but continues to sweep across the surface of the detector, passing through a null during each zone transition. At the time of such transition, the electronics takes notice and causes the linear encoder to record and indicate the position of the translatable table corresponding to the indexed position of the specimen. The apparatus uses a detector having a segmented surface with null conditions between the discrete active zones and in operation, the system continues to sweep the imaged spot across the detector surface, with the servocircuit continually sweeping the spot through the detector interface and data register occurring each time the spot crosses through null. The system has great dynamic range and is limited only by the movement allowed by the encoder. The detector requirements do not include a need for linearity since the intersection of the imaged spot with a null point is the significant event for data register and changes in the detector output due to temperature induced variations are of no consequence.

A typical embodiment of the invention includes a radiation source such as a helium-neon laser which is readily modulatable at the frequencies of interest and is also inherently collimated. The laser is intensity modulated by varying the excitation voltage of the pumping system to cause the gain of the laser medium to oscillate around an average value of unity; the modulation frequency is nominally 10 kilohertz, a frequency indicated by practical considerations. Ten kilohertz is readily attainable and also sufficiently high so that spurious sources of various modulations do not interfere with the detector operation. By way of contact, a zirconium arc is operable as a modulated intensity light source, however, the freqency at which it can be modulated is too low for the applications described herein.

The electronics package 60 discriminates against all signals which are not suitably modulated over the narrow bandwidth representing the frequency of response of the servosystem. Spurious signals from the environment which could tend to confuse the detector are eliminated since most of these operate in a range of approximately 100 Hertz. A significant characteristic inherent in the detection technique is the avoidance of any error due to DC drift in the detector; this potential problem is absent since the electronics provides servosignals in response to only those inputs which occur at the prescribed rate of modulation. Further, the electronics examines the signal 58 from the preamplifier to determine the direction in which the translatable table is to be moved to drive the imaged spot through null. The techniques used in this regard are well known and need not be developed here. In addition, these electronics provide the intensity modulation control as well as an automatic gain control, the latter being necessary to compensate for those variations in the surface characteristics of the test specimen which affect the amount of scattered light sensed on the detector. Effectively, the gain control adjusts the percent of modulation applied to the radiation source so that the electronics package receives signal intensities which are proportional to the degree of modulation.

The light source must be collimated in any embodiment in which it moves with respect to the incident lens. If the light is not collimated, the reciprocating motion of the incident lens with respect to the light source will smear out the focus spot on the specimen. Further, the degree of collimation of the radiation source affects the size of the spot on the surface of the test specimen, the better the collimation the smaller the spot. The accuracy of the measurement increases as the diameter of the spot is reduced. With a zirconium arc source, for example, a pinhole screen is required so that the light source approximates a collimated light source and a spot of practical size can be formed on the test specimen.

One of the problems with the noncontact optical triangulation method which relies on a closed loop concept with suitable feedback and recording elements is that the loop may be broken under some conditions of operation due to shadowing. More specifically, the beam of focused radiation which is passed along the surface of the test specimen sometimes strikes a surface irregularity such as a relatively deep hole. In some instances the side walls of the hole intercept the reflected radiation which would otherwise strike the detector. When such a sequence occurs, there is a tendency for the servosystem to start slewing wildly in an attempt to get the imaged spot to reappear on the face of the detector. To avoid such excursions when the imaged spot is lost, a latching circuit is incorporated into the detection electronics to hold the servosystem at the last position for which a feedback signal was received. When the imaged spot is regained, the latching lock is removed and gauging is resumed.

The present invention is capable of two modes of operation, each having its own advantages and characteristics. In the first mode only the detector is translated by the servosystem until the imaged spot sweeps through a null point. With this mode, several cross sections of the same test specimen can be gauged simultaneously by providing a corresponding number of sets of focused light sources imaging lenses and detectors.

Multiple simultaneous readings are desirable, particularly in a production facility, however, this mode of operation has inherent sources of errors. For example, the size of the focus spot changes depending upon the position of the test specimen along the X axis, the precise amount of change depending upon the $f$ number of the incident lens. The change in spot size is a concern with respect to those areas on the test specimen having edges and sharp curvatures but it has essentially no effect on the accuracy in other regions since the detector tracks the center of the imaged spot and the spot size is therefore relatively unimportant provided the entire surface of the detector is not illuminated by the imaged spot. The imperfections in the collecting lens is of greater concern since these imperfections lead to error if the radiation enters the collecting lens at various angles. The errors due to the lens imperfections can be minimized through the use of an incident lens having a large $f$ number and calibration of the system with parts of known cross sections which eliminate the effects of the imperfections in the collecting lens.

The second mode of operation of the present invention involves translation of the test specimen until the imaged spot is driven through a null position, a superior operational mode from an accuracy consideration since the effects of the forcusing are eliminated. The point at which the focused beam intercepts the test specimen remains spatially fiixed and therefore the angle between the axis of the reflected energy passing through the collecting lens and the incident axis is constant thereby avoiding the error introduced if the point of reflection is allowed to change with respect to the collecting lens. The primary criticism of this mode of operation is that if the test specimen is translated each cross section of the test specimen to be gauged has to be scanned separately. The problem can be eliminated, however, by suitable translation of the detector and lenses in a coordinated sequence.

Either mode of operation is readily adaptable to the automatic gauging of high production rate products. Very simply the output from the nulling bridge circuit portion of the electronics package provides a feedback signal and either the specimen or the detector is servo controlled. With a rotary encoder attached to the drive mechanism of the translatable table or a linear encoder attached directly to the table, an automatic readout of the circuit variation can be derived. Both types of readout devices are especially compatible with computer input requirements, thereby rendering this teaching amenable to the computer data processing.

A windfall advantage inherent in the present invention is the avoidance of a source of inaccuracy found in probe type surface gauge devices and referred to herein as cosine rolloff. In a mechanical gauge having a probe with a spherical tip which follows the contour of the surface under investigation, the readout device is calibrated to account for the length of the probe plus one diameter of the sphere. However, if the probe is not perpendicular to the surface being investigated the end of the probe is less than one sphere diameter from the surface, the precise difference being a function of the angle between the probe and the surface. The maximum possible error introduced in a mechanical system of this type is the function of the length of the probe and the diameter of the sphere.

The present invention can be practiced with the substitution of holographic lenses for the conventional ground lenses shown in the drawing. When holographic lenses are used, a single photographic plate can replace both the incident and collecting lenses shown and discussed above; such a substitution allows a substantial reduction in the weight with subsequent enhanced frequency response of the servosystem. The operation of the hologram and the conventional lens system is the same since the incident beam of collimated light is focused to a point by the hologram and a portion of the same hologram is used to collect some of the scattered beams to form an imaged spot on the detector. Of course the hologram application requires that the light source be monochromatic and for all practical purposes such radiation sources are lasers. Holographic lenses have the additional advantage that the radiation can be directed at various angles during the formation of the flat hologram plate rather than the physical orientation of a lens as is required in conventional optics.

One system which is representative of the kind of performance possible with this equipment is capable of gauging turbine blades 2 inches in width with surface contour variations up to one half inch. The range reflects the characteristics of the particular linear actuator and encoder integrated into the system and not inherent limitations. The volume of the overall system is approximately a one foot cube and its weight is between 20 to 30 pounds. With this embodiment, the entire width of the 2-inch blade can be gauged for production quality control purposes to within a ten thousandth of an inch in approximately one second.

Although this invention has been shown and described with respect to preferred embodiments thereof, it should be understood by those skilled in the art that various other changes and omissions in the form and detail thereof may be made therein without departing from the spirit and scope of the invention.

Having thus described a typical embodiment of my invention, that which I claim as new and desire to secure by Letters Patent of the United States is:

1. Apparatus for gauging the surface contour of a test specimen comprising:
   means for providing an incident beam of radiation;
   means for modulating the intensity of the beam;
   means for concentrating the beam and directing the concentrated beam along an incident axis to a spot on the surface of the specimen;
   detection means for the production of electronic signals in response to the radiation incident thereon, the detection means being positioned along a collecting axis and having a surface comprising a plurality of discrete zones with a null position between adjacent zones;
   means for collecting radiation reflected by the specimen and diverting the collected radiation along the collecting axis to form an imaged spot on the detection means surface;
   means responsive to the electronic signals for locating the particular zone of the detection means upon which the imaged is incident and for providing a corresponding position signal;
   means responsive to the position signal for causing relative motion between the specimen and the detection means to drive the imaged spot across the surface zone through the null position;
   means responsive to the passing of the imaged spot through a null position for providing null signals; and means responsive to the null signals for indicating the displacement of the imaged spot with respect to the detector between successive null signals.

2. The invention according to claim 1 wherein; the means for concentrating the beam and directing the concentrated beam along the incident axis, and the means for collecting the radiation reflected by the specimen and directing the collected radiation along the collecting axes are lenses.

3. The invention according to claim 1 wherein the incident beam is monochromatic radiation.

4. The invention according to claim 3 wherein; the means for concentrating the beam and directing the concentrated beam along the incident axis, and the means for collecting the radiation reflected by the specimen and directing the collected radiation along the collecting axes are a hologram.

5. The invention according to claim 1 including further a latching circuit for preventing relative motion between the specimen and the detector in the absence of a position signal.

6. The method of gauging the surface of a test specimen including the steps of:

providing an incident beam of radiation;

modulating the intensity of the beam at a preselected frequency;

concentrating the beam along an incident axis to a spot on the surface of the specimen;

collecting radiation reflected at the spot on the specimen along a collecting axis;

providing a flat radiation sensitive surface along the collecting axis and perpendicular thereto;

forming an image of the spot on the radiation sensitive surface;

scanning the spot across the surface of the specimen in a succession of incremental movements;

moving the detector with respect to the specimen between each incremental movement whereby the imaged spot is passed through a prescribed reference on the surface of the detector;

measuring the displacement of the detector surface in the plane perpendicular to the collecting axis required to cause the imaged spot to pass through a reference; and correlating the measured displacement of the detector surface with the corresponding variation in the surface of the specimen.

* * * * *

UNITED STATES PATENT OFFICE
CERTIFICATE OF CORRECTION

PATENT NO. : 3,909,131
DATED : September 30, 1975
INVENTOR(S) : JAMES P. WATERS

It is certified that error appears in the above-identified patent and that said Letters Patent are hereby corrected as shown below:

| | |
|---|---|
| Column 5, line 15 | "focusing" should read -- signal. -- |
| Column 5, line 17 | "fixed" should read -- error -- |
| Column 8, line 59 | after "imaged" insert -- spot -- |

Signed and Sealed this sixteenth Day of December 1975

[SEAL]

Attest:

RUTH C. MASON
*Attesting Officer*

C. MARSHALL DANN
*Commissioner of Patents and Trademarks*